United States Patent [19]
Ragle et al.

[11] 3,984,868
[45] Oct. 5, 1976

[54] TAPE SPEED CONTROL APPARATUS FOR MAGNETIC TAPE DEVICE

[75] Inventors: Herbert Underwood Ragle, Thousand Oaks; Francis Arthur Morse, Camarillo; Lewis Buel Coon, Jr., Thousand Oaks, all of Calif.

[73] Assignee: Burroughs Corporation, Detroit, Mich.

[22] Filed: Feb. 3, 1975

[21] Appl. No.: 546,714

[52] U.S. Cl. .................................. 360/73; 242/186; 242/191; 318/309
[51] Int. Cl.² .................. G11B 15/52; G11B 19/24
[58] Field of Search .................. 360/73, 71, 74; 242/186, 188, 191, 75.5, 75.51, 184; 318/309–311

[56] References Cited
UNITED STATES PATENTS

| | | | |
|---|---|---|---|
| 3,439,354 | 4/1969 | Behr et al. | 360/73 |
| 3,500,362 | 3/1970 | Schmitz et al. | 360/73 |
| 3,582,781 | 6/1971 | Uemura et al. | 360/73 |
| 3,646,535 | 2/1972 | Behr | 360/73 |
| 3,666,883 | 5/1972 | Yano et al. | 360/73 |
| 3,764,087 | 10/1973 | Paananen et al. | 242/186 |

*Primary Examiner*—Alfred H. Eddleman
*Attorney, Agent, or Firm*—Nathan Cass; Kevin R. Peterson

[57] ABSTRACT

Improved apparatus for controlling tape speed in a reel-to-reel magnetic tape transport system. A controllable reel drive motor operates in response to a control signal derived from an accumulated count of reel revolutions so that the driven reel is driven at a varying angular velocity chosen to produce a substantially constant predetermined tape speed as the tape is wound. In order to more accurately maintain a constant tape speed an indication of tape speed error is obtained by measuring and comparing with a reference the elapsed time between the writing and recording of a signal using a magnetic head arranged for read-after-write operation, any resulting tape speed error being employed to change the accumulated count in a direction which reduces the tape speed error.

14 Claims, 3 Drawing Figures

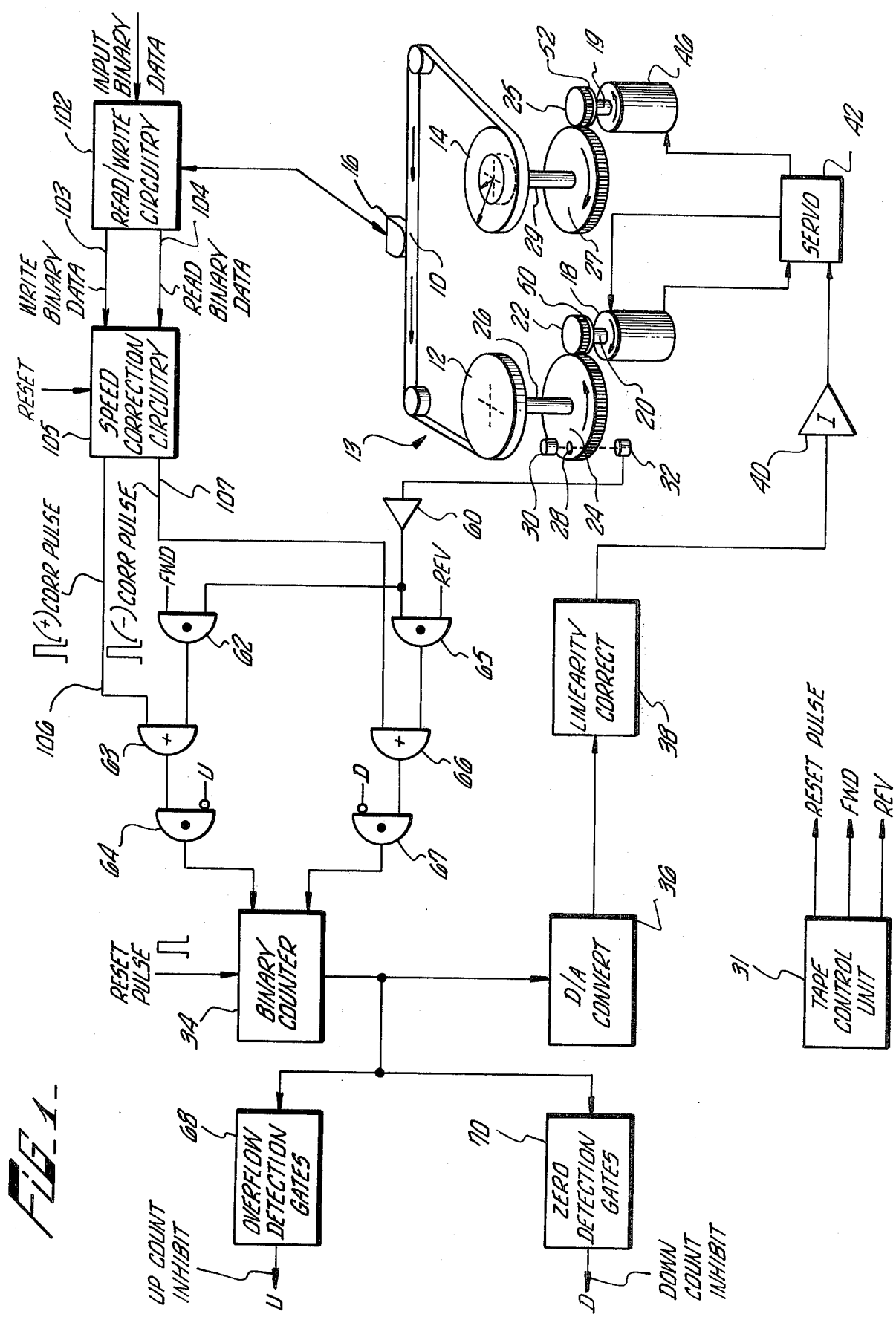

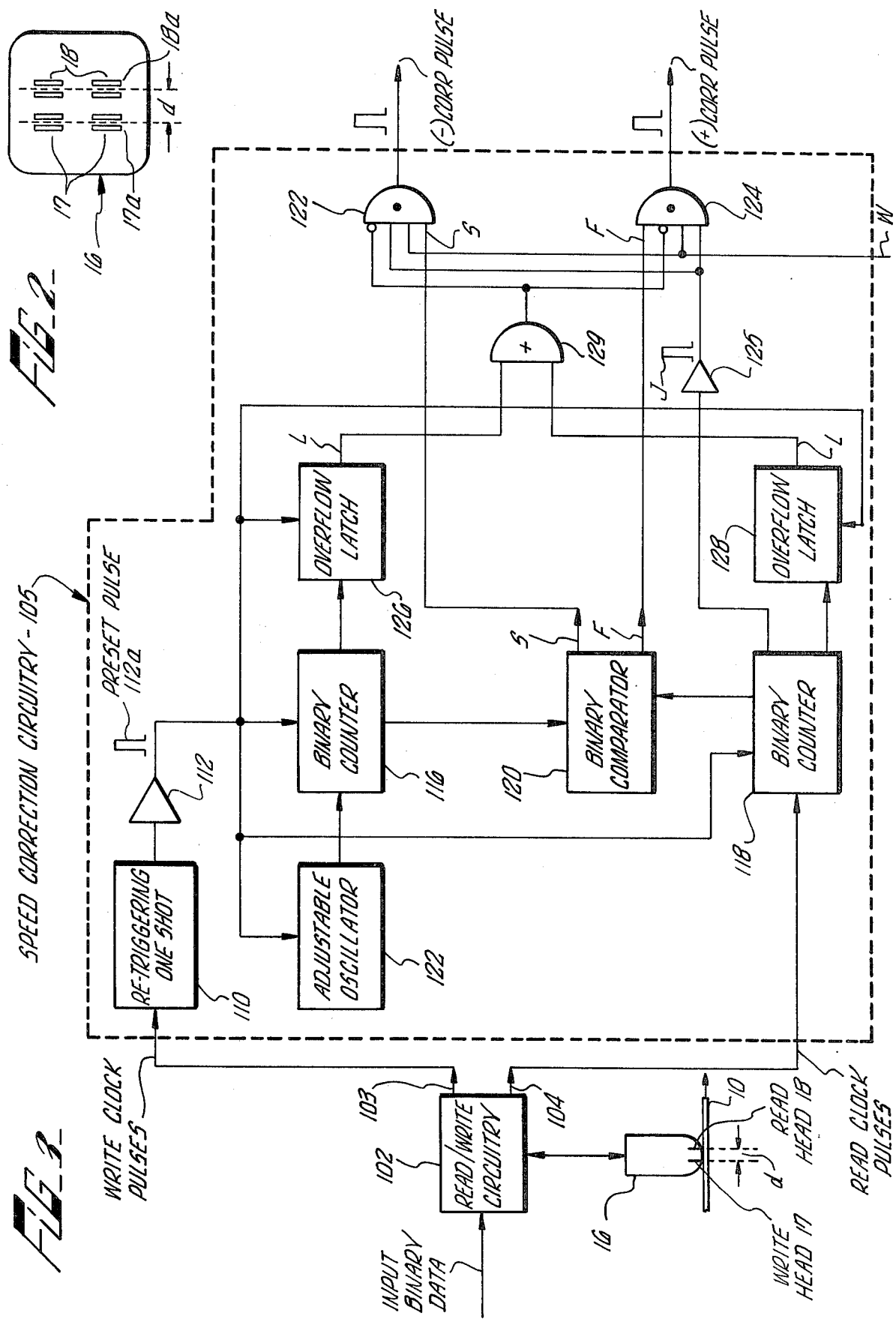

TAPE SPEED CONTROL APPARATUS FOR MAGNETIC TAPE DEVICE

BACKGROUND OF THE INVENTION

This invention relates generally to magnetic tape recording systems. More particularly, the invention relates to improved means and methods for more accurately controlling the speed of a magnetic tape in a reel-to-reel magnetic tape driving system.

One known approach for controlling tape velocity using a reel-to-reel drive mechanism requires the use of a prerecorded clock track on the tape. Clock pulses read from the clock track indicate the linear velocity of tape. If the tape velocity is too high, as indicated by more pulses being read in a preset time interval, a servo control system is used to slow down the angular velocity of the motor driving the take-up reel. This approach has the obvious disadvantage of requiring the use of a clock track on the tape.

Another known approach for maintaining constant tape velocity in a reel-to-reel tape drive system involves the use of a tachometer which is driven along with the tape. The tachometer signal indicates when the desired linear tape velocity has been reached and controls the rotational velocity of the take-up reel. Although this method eliminates the need for a clock track, slippage may occur between the tape and the tachometer apparatus, thereby reducing the accuracy of tape velocity control.

Another and particularly advantageous approach for providing tape velocity control with a reel-to-reel drive is disclosed in the commonly assigned U.S. Pat. No. 3,764,087. In a preferred embodiment described in this patent, optical sensing means are employed for producing a series of signals, the accumulated number of which is indicative of the number of revolutions of one of the reels. A binary counter which is set to zero at the beginning of winding of the tape counts these signals to produce a corresponding digital output signal representative of the number of turns of tape wound on the take-up reel. The counter counts up when the tape is moving in the forward direction and counts down when the tape is moving in the reverse direction. A digital-to-analog converter converts the digital output signal of the counter to an analog signal which is then applied to a linearity correcting circuit. The linearity correcting circuit is specially designed to modify the analog signal in a manner so as to cause the motor servo control unit to control the driving motor to rotate the reel at a velocity inversely proportional to increasing tape diameter, thereby maintaining a substantially constant linear velocity of tape.

Using the above described approach disclosed in U.S. Pat. No. 3,764,087, it has been found that the linearity correcting circuit can be adjusted with a precision alignment tape to provide a linear tape speed error of less than 1% over the entire length of the tape. However, as recognized in the aforementioned U.S. Pat. No. 3,764,087, the accuracy of this adjustment of the linearity correcting circuit is subject to variations in tape thickness as well as variations in the hub dimensions of the take-up reel. If a tape is used which has a varying thickness or a thickness different from that of the alignment tape, or if the hub dimensions are different, the linearity correcting circuit which was adjusted for a precision alignment tape and a given hub will no longer be able to provide the same accuracy of speed control, since such variations can cause the diameter of the tape wound on the take-up reel to be different for a given count than that obtained for the alignment tape. For example, a 10% difference in tape thickness from that of the alignment tape can cause an increasing speed error as the tape is wound amounting to approximately 6% when the tape is fully wound on the take-up reel.

Because of these inaccuracies inherent in the counter approach, the aforementioned U.S. Pat. No. 3,764,087 additionally presents an alternate embodiment employing an optical system for directly sensing tape diameter on a reel so as to thereby provide a signal to the servo control which more accurately corresponds to the actual diameter of the tape on the reel. However, as recognized in the patent, although this alternate optical approach is insensitive to hub or tape thickness, it is inherently less stable and more complex than the counter approach.

SUMMARY OF THE INVENTION

In accordance with a preferred embodiment of the present invention, inaccuracies in speed control resulting from variations in tape thickness and hub dimensions in the counter approach disclosed in the aforementioned U.S. Pat. No. 3,764,087 are substantially eliminated during writing with a minimum of additionally required circuitry. This is accomplished in the preferred embodiment by making use of the spacing between the read and write gaps normally existing in a conventional read-write electromagnetic head to provide a measurement of actual tape speed during a writing operation. Samplings of this tape speed measurement are used to produce correction pulses which are applied to the binary counter for reducing or increasing the count thereof so that the resultant output of the linearity correcting circuit provides a control signal to the motor serve which more accurately corresponds to actual tape speed.

A further feature of the invention resides in the manner in which the invention provides for obtaining a measurement of tape speed from the recorded data track without the need for an additional track. Thus, the preferred embodiment of the present invention permits achieving significantly greater tape speed accuracy, while still retaining the simplicity and other advantages inherent in the counter approach described in the aforementioned U.S. Pat. No. 3,764,087.

Although the above approach of the present invention for more accurately controlling tape speed is applicable only during writing, it will be understood that the approach is nevertheless of considerable value, particularly where it is required that a tape be accurately copied. Also, it will be appreciated that since the present invention provides for highly accurate speed control during recording of a tape, reading of the tape will then be more reliable, even though the same speed control accuracy is not available during reading.

BRIEF DESCRIPTION OF THE DRAWINGS

The specific nature of the present invention as well as other objects, features, advantages and uses thereof will become readily evident from the following description of a preferred embodiment taken in conjunction with the accompanying drawings in which:

FIG. 1 is a general schematic diagram illustrating a preferred embodiment of the invention.

FIG. 2 is a diagrammatic illustration of a conventional type of two-track electromagnetic read-write head which may typically be employed in the embodiment of FIG. 1.

FIG. 3 is an electrical block diagram illustrating a preferred embodiment of the speed correction circuitry shown in block form in FIG. 1.

Like numerals designate like elements throughout the figures of the drawings.

DESCRIPTION

Referring initially to FIG. 1, illustrated therein is a preferred form of the present invention. It is to be noted that the basic mechanical drive portions of the present invention illustrated in FIG. 1 may be similar to those illustrated generally in FIG. 1 of the aforementioned U.S. Pat. No. 3,764,087, and in more detail in FIG. 2 of the patent. For ease of comparison, elements in FIG. 1 hereof which may be similar to those disclosed in the patent are given like numerical designations. The disclosure in U.S. Pat. No. 3,764,087 is incorporated herein.

In the embodiment of the present invention illustrated in FIG. 1 hereof, a magnetic tape 10 is driven between a take-up reel 12 and a supply reel 14 and past a two-track electromagnetic read-write head 16. As illustrated in FIG. 2, the electromagnetic head 16 may comprise a linearly aligned pair of write heads 17, one for each track, having a write gap 17a and spaced by a distance d (which may typically be 0.15 inch) from a parallel read gap 18a formed by a pair of linearly aligned read heads 18, one for each track. Although two tracks or channels are illustrated in FIG. 2, the present invention may also be advantageously employed with a single track head, as will hereinafter become evident. The reels 12 and 14, the tape 10, and the head 16 may be part of a conventional read-after-write tape cassette magnetic recording and reproducing device indicated generally by the numeral 13. However, the invention is not to be considered as limited thereto or to the particular exemplary motor drive arrangement illustrated in FIG. 1 and described below.

A forward drive motor 18 in FIG. 1 is used to drive the take-up reel 12 through a drive chain including a motor drive shaft 20, a clutch 50, a motor drive wheel or gear 22, a follower wheel or gear 24, and a drive shaft 26. Similarly, a reverse drive motor 46 is used to drive the supply reel 14 through a drive chain including a motor drive shaft 19, a clutch 52, a gear 25, a follower gear 27 and a drive shaft 29.

Clutches 50 and 52 are electromechanical clutches well known in the art which are individually actuated. For example, in a typical cassette type system, the introduction of a cassette causes motors 18 and 46 to continuously rotate shafts 19 and 20 in opposite directions as indicated. Clutches 50 and 52 are used to respectively disconnect the rotating shafts 19 and 20 from gears 22 and 25 and hence from reels 12 and 14. In order to drive take-up reel 12 and wind tape thereon, clutch 50 alone is actuated, causing it to connect shaft 20 to gear 24 and hence cause rotation of take-up reel 12. Similarly, in order to drive supply reel 14, clutch 52 alone is actuated, causing it to connect shaft 19 to gear 24 and hence cause rotation of supply reel 14. It should be noted that follower gear 24 is connected to and rotates with take-up reel 12 regardless of whether motor 18 drives tape onto the take-up reel 12 or whether motor 46 drives tape onto supply reel 14. Typically, a 1:1 ratio of rotation is employed between reel 12 and follower gear 24.

As explained in detail in the aforementioned U.S. Pat. No. 3,764,087, motor 18 in FIG. 1 is responsive to applied control signals from a servo control unit 42 for driving the reel 12. As described in detail in connection with FIG. 2 of the patent, the signal supplied by the servo 42 to motor 18 is caused to have a non-linear signal component which is inversely proportional to the diameter of tape wound on the take-up reel 12 so as to thereby cause motor 18 to maintain a substantially constant linear velocity of the tape 10.

Still with reference to FIG. 1 hereof, a circular aperture 28 is defined through take-up reel follower 24. A light source 30 is located proximate to the upper surface of follower 24 and at the same radius from the center of the follower as aperture 28. Follower 24 acts as a mask prohibiting light from passing to the underside thereof except when the light source 30 is aligned with aperture 28 as shown in FIG. 1. A photo detection means 32, such as a photoelectric cell, is aligned with the light source 30 and is positioned proximate the lower surface of follower 24. Cell 32 emits an electrical signal each time light strikes it from light source 30, i.e., each time follower 24, and thus take-up reel 12, rotates 360° % about their common axes. It is to be understood that other means could also be employed for providing signals related to rotation of the take-up reel.

The signals generated by photoelectric cell 32 are counted by a binary counter 34. More specifically, signals from photoelectric cell 32 are suitably amplified and shaped by an amplifier 60 and then applied to the UP and DOWN inputs of the binary counter 34 via AND gate 62, OR gate 63, and AND gate 64 for the UP input, and via AND gate 65, OR gate 66, and AND gate 67 for the DOWN input. When the tape is being moved in the forward direction, signal FWD applied to AND gate 62 is true while signal REV applied to AND gate 64 is false, and when the tape is being moved in the reverse direction, signal REV is true while signal FWD is false. Thus, during forward tape movement, signals from the photoelectric cell 32 cause the counter to increase its count, while during reverse tape movement of the count is caused to be decreased. The signals FWD and REV may be obtained from a conventional tape control unit 31 which also provides a reset signal for setting the counter 34 to a reference count, such as zero, at the beginning of winding of the tape. This reset signal may be generated in a conventional manner, such as by using a photo detector circuit (not shown) responsive to the transition between the magnetic tape and the transparent tape portion (clear leader) normally provided at the beginning of a reel of magnetic tape.

Although the invention is not limited thereto, in the preferred embodiment shown herein the binary counter 34 increases or decreases one count for each revolution of the reel (depending on the direction of tape movement). Thus, the accumulated count of the binary counter 34 is dependent on the total number of layers of tape wound on the reel 12. In order to prevent the binary counter 34 from counting UP through its maximum all "ones" count or down through its all "zeros" count overflow detection gates 68 and zero detection gates 70 are provided connected to the output of the binary counter 34 for respectively detecting the all "ones" and all "zeros" count conditions of the counter 34 and for causing their respective outputs U and D to become true when these count conditions are detected. These U and D outputs are applied to the inverse inputs of AND gates 64 and 67, respectively, to thereby prevent counting pulses from being applied to the UP and DOWN counter inputs which would cause the counter 34 to count up through its maximum count or down through its all "zeros" count.

The output of the binary counter 34 in FIG. 1 is applied to a digital-to-analog converter 36 for converting the digital count thereof to a corresponding analog signal which is then applied to the linearity correcting circuit 38. The manner in which the nonlinearity circuit 38 is designed will be understood by recognizing that, if a constant angular velocity were to be provided for reel 12, the increasing diameter of tape on the take-up reel as the tape is wound would result in producing a correspondingly increasing tape speed. Accordingly, in order to maintain a constant tape speed, the angular velocity of the reel has to be decreased by an appropriate amount dependent on tape diameter. As explained in detail in the aforementioned U.S. Pat. No. 3,764,087, the required speed characteristic is provided by controlling the angular velocity of the motor in a manner so as to cause the reel to be rotated at a velocity inversely proportional to increasing tape diameter, thereby maintaining a substantially constant linear tape speed as the tape is wound on the reel. This is advantageously accomplished by designing the circuit 38 to appropriately modify the analog signal applied thereto so that application of the resulting modified signal, via inverter 40, to the servo 42 will provide the desired control of the angular velocity of motors 18 and 46. Details of preferred circuitry for providing such operation are disclosed in the aforementioned U.S. Pat. No. 3,764,087 and will not be repeated here.

So far, this description has primarily been concerned with those portions of FIG. 1 which provide operation similar to the counter approach disclosed in the aforementioned U.S. Pat. No. 3,764,087. As pointed out previously, although relatively simple hardware is required for implementation of this counter approach, the speed control provided thereby is subject to errors because of variations in tape thickness and hub dimensions. The improvements of the present invention whereby such errors are significantly reduced will next be described.

FIG. 2 illustrates a conventional two-track read-write head 16 cooperating with the read-write circuitry 102 shown in FIG. 1 for writing and reading binary data on the tape 10 in a conventional manner. In the preferred embodiment, recording is permitted only in the forward direction with the head 16 being arranged for read-after-write recording on the tape. Thus, a bit written at a write head 17 (FIG. 2) will be read a short time later by a corresponding read head 18. The elapsed time between the writing of the bit by the write head 17 and the reading of the bit by the read head 18 will be a measure of the actual linear speed of the tape.

As illustrated in FIG. 1, speed correction circuitry 105 is provided for obtaining a measure of actual linear tape speed. Signals representative of the binary data being written on one track of the tape are applied to the speed correction circuitry 105 from the read-write circuitry 102 via line 103, while signals representative of the binary data being read from this same track is applied to the speed correction circuitry 105 from the read/write circuitry 102 via line 104. As will hereinafter be considered in detail with reference to the preferred embodiment of the speed correction circuitry 105 illustrated in FIG. 3, the speed correction circuitry 105 is constructed and arranged to detect the elapsed time between the writing and reading of binary data, and to produce a (+) correction pulse on output line 106 if the detected tape speed is too fast, or a (−) correction pulse output line 107 if the detected tape speed is too slow. Since the (+) correction pulse is fed via OR gate 66 to the UP input of the binary counter 34, and the (−) correction pulse is fed via OR gate 68 to the DOWN input, the count of the binary counter 34 will be increased or decreased in accordance with the actual tape speed detected, thereby causing the motor servo 42 to change the tape speed in the desired direction. In other words, the (+) and (−) correction pulses serve to change the count of the counter 34 to make it appear that more or less of the tape is wound on the take-up reel than may actually exist in order to provide a simple and advantageous way of correcting a tape speed error. The rate of generation of the correction pulses by the speed correction circuitry 105 is chosen in accordance with the accuracy of speed control desired.

Referring now to FIG. 3 illustrated therein is a preferred embodiment of the speed correction circuitry 105 shown in block form in FIG. 1. In the preferred embodiment, it will be assumed that binary data is recorded on the track which is used for tape speed control in a self-clocking code, such as the well known phase modulation recording code. Accordingly, the write clock signals conventionally provided in the read/write circuitry 102 for use in writing such a self-clocking code are used in the preferred embodiment of the present invention to indicate the time of writing of binary data at the write head 17, and the read clock signals derived by the read/write circuitry 102 from the data read by the read head 18 are used to indicate the time of reading of this binary data at the read head 18. Typically, these write and read clock signals may have a frequency of 8 kilohertz. Thus, during writing of a record on the tape, the write clock pulses occur every 125 microseconds.

It will also be assumed for illustrative purposes that the spacing d between the gaps of the write and read heads 17 and 18 is 0.15 inches, and that the desired tape speed is 10 inches per second. Thus a bit written at the write head should be read at the read head exactly 15 milliseconds later. If the actual time is less than 15 milliseconds, the tape is moving too fast, or if the actual time is greater than 15 milliseconds, then the tape speed is too slow.

With the above assumptions in view, FIG. 3 will now be considered in detail. It will be understood that binary data is typically recorded on magnetic tape in the form of records with each record being spaced from adjacent records by an amount significantly greater than the spacing between write clock pulses. This spacing between records is employed in the preferred embodiment being described to provide a preset pulse for use in synchronizing the various components of the speed correction circuitry 105 of FIG. 3. More specifically, as illustrated in FIG. 3, write clock pulses from the read/write circuitry 102 are applied to a re-triggering one-shot 110 which is turned "on" by the leading edge of a write clock pulse. The "on" time of the one-shot 110 is chosen to be greater than the time interval between the write clock pulses, but less than the time interval between records on the tape. Thus, during the writing of a record, the write clock pulses will successively re-trigger the one-shot 110 before it can time out so that the one-shot 110 will remain "on" or true. However, when the record is completed, no further write clock pulses will occur until the writing of the next record. Since the spacing between records is greater than the "on" time of the one-shot 110, it will turn "off" of false. The output of the one-shot 110 is applied to a pulse amplifier 112 which produces a narrow pulse 112a in response to the leading edge of the turn-on output signal from the one-shot 110.

Since the one-shot is turned "on" by the leading edge of the first clock pulse of a record and remains "on" until the record is completed, this pulse 112a can thereby serve as a preset pulse to preset and/or initiate the operation of other portions of the circuitry of FIG. 3 at the beginning of each record.

As shown in FIG. 3, the speed correction circuitry 105 includes a pair of conventional binary counters 116 and 118 whose count states are compared by a conventional binary comparator 120 in a conventional manner. The binary counter 116 serves as a timing reference and is set to a zero count by a preset pulse 112a in response to the first clock pulse of each record. The counter 116 counts pulses from an adjustable oscillator 122 which is also synchronized by the preset pulse in response to the first write pulse of each record. The preset pulse 112a is chosen to be sufficiently narrower than a write clock pulse so as to permit the counter 116 to be advanced in response to the first write clock pulse. The count of the counter 116 thus represents the time elapsed since the writing of the first binary digit of a record. In the preferred embodiment being described, the oscillator 122 preferably has the same frequency as the write clock pulses which has been assumed to be 8 kilohertz for illustrative purposes. Accordingly, during writing of a record the counter 116 will be advanced one count every 125 microseconds. As mentioned previously, it is assumed that the spacing d between the gaps of the read and write heads is 0.15 inch, and that the desired tape speed is 10 inches per second, in which case the first written binary digit of a record should arrive at the read head 15 milliseconds after being written. This is equivalent to a count of 120 of the binary counter 116, since 120 × 125 microseconds equals 15 milliseconds.

The second binary counter 118 counts in response to the read clock pulses and is preset to a count of 119 by the preset pulse. Thus the first read clock pulse derived from the signal read by the read head will advance the counter 118 to a count or 120. If the tape speed is the desired 10 inches per second, counter 116 will also have been advanced to a count of 120. However, if the tape speed is too fast, the counter 118 will reach the count of 120 before the counter 116. On the other hand, if the tape speed is too slow, the counter 116 will reach the count of 120 ahead of the counter 118. The frequency of the adjustable oscillator 122 is made variable so as to permit an accurate initial or set-up adjustment and/or to provide compensation for variations in the read and write gap spacing d. In other words, the frequency of the oscillator 122 is adjusted so that the counters 116 and 118 will track, that is, have the same count when the tape speed is correct. Typically, each of the counters 116 and 118 may be comprised of twelve binary stages so as to permit counting up to a count of $2^{12}$.

The binary comparator 120 may be of conventional form and operates to continuously compare the counts of binary counters 116 and 118. If the count of binary counter 116 is greater than that of binary counter 118, indicating that the tape speed is too slow, then the S output of the comparator 120 will be true and the F output false. On the other hand, if the count of binary counter 118 is greater than that of binary counter 116, indicating that the tape speed is too fast, then the F output of the compartor 120 will be true and the S output false. If the counts of binary counters 116 and 118 are the same, then both the comparator outputs T and F will be false.

As illustrated in FIG. 3, the S comparator output as applied as an input to an AND gate 122, while the F comparator output is applied to an AND gate 124. Also applied to AND gates 122 and 124 is a signal W which is true during a writing operation and a sampling pulse J derived from a selected count of the binary counter 118 and fed to AND gates 122 and 124 via a shaping amplifier 125. These sampling pulses J determine the times during the writing of a record that the states of the outputs S and F of the comparator 120 are sampled.

In the preferred embodiment of FIG. 3, the spacing between the sampling pulses J is chosen to be at least equal to the time required for a bit recorded at the write head to move to the read head, that is, at least 15 milliseconds assuming a read/write gap spacing d of 0.15 inch and a desired tape speed of 10 inches per second. Such a choice for sampling pulse spacing is desirable in order to permit sufficient time for a speed correction initiated in response to a sampling pulse to produce a speed correction before the occurrence of the next sampling of the tape speed. Accordingly, the sampling pulse J may be derived from the $2^8 = 128$ stage of the counter 118. As a result, since the counter 118 will count to a count of 120 in response to the first read clock pulse of a record, the first sampling pulse J of a record will be produced when the eighth clock pulse is read (i.e., when the counter is at count 128) and every 128th read clock thereafter. This provides a spacing of 120 × 125 = 15 milliseconds between the first and second sampling pulses of a record and a spacing of 128 × 125 = 16 milliseconds between the following sampling pulses. For binary counters 116 and 118 having twelve stages, such as choice of sampling pulse spacing will provide up to 32 samples per record.

In order to permit operation with long records greater than the capacity of the counters 116 and 118, overflow latches 126 and 128 are provided connected to counters 116 and 118, respectively, and having outputs L which change from true to false when their respective binary counter 116 or 118 reaches its maximum count. These latch outputs L are applied via OR gate 129 to respective inverse inputs of AND gates 122 and 124 so as to thereby inhibit these AND gates when either of the counters 116 and 118 reaches its maximum count.

It will thus be understood with respect to FIG. 3 that operation during writing of a record is such that the comparator 120 is sampled at the occurrence of each sampling pulse J. If the tape speed is correct, as indicated by the counters 116 and 118 having equal counts, then both S and F will be false causing both of the AND gates 122 and 124 to be inhibited and thereby prevent the sampling pulse J from passing therethrough, the result being that neither a (+) correction pulse nor a (−) correction pulse will be produced during the occurrence of that sampling pulse J. However, if the S comparator output is true during the occurrence of a sampling pulse J, indicating that the tape speed is too slow, then AND gate 124 will be inhibited while AND gate 122 will be enabled, causing the sampling pulse J to pass therethrough and produce a (−) correction pulse. On the other hand, if the F comparator output is true, indicating that the tape speed is too fast, then AND gate 122 will be inhibited while AND gate 124 will be enabled, causing the sampling pulse J to pass therethrough and produce a (+) correction pulse. The manner in which these (+) and (−) correction pulses are used to provide a correction in the tape speed has previously been described in connection with FIG. 1. During writing of each record, the overflow latches 126 and 128 serve to inhibit both of AND gates 122 and 124 if either of the counters 116 or 118 reaches its maximum count, thereby preventing the occurrence of improper correction pulses. Typically, a single count correction in the count of the counter 34 in FIG. 1 may provide a 0.16% speed correction at the beginning of winding of a tape which decreases to a 0.0675% correction at the end of winding of the tape.

It is to be understood that the present invention is not to be considered to be limited to the particular exemplary embodiment described above, since many modifications and variations are possible within the scope of this invention as defined by the appended claims.

What is claimed is:

1. In a tape transport system, apparatus for transporting the tape between supply and take-up reels in a manner so as to provide improved control of tape speed comprising:
   first means responsive to an applied control signal for driving one of said reels;
   second means for providing an output signal dependent on the number of layers of tape wound on the driven wheel;
   third means responsive to the output signal from said second means for providing a control signal to said first means chosen for a given tape and driving reel so as to cause rotation of the driven reel at a varying angular velocity which provides a predetermined tape speed as the tape is wound;
   fourth means for measuring the actual speed of the tape and for producing a tape speed correcting signal indicative of whether the actual tape speed is different from said predetermined tape speed; and
   fifth means responsive to said tape speed correcting signal for modifying the output signal provided by said second means in a manner so as to cause said second means to produce a resulting control signal which controls the angular velocity of said driven wheel to provide an actual tape speed more accurately conforming to the desired predetermined tape speed.

2. The invention in accordance with claim 1, wherein said second means includes:
   means for providing a series of signals corresponding to the number of revolutions of said driven reel; and
   counting means for counting said series of signals and for providing a counting means output signal dependent upon the number of layers of tape wound on the driven reel.

3. The invention in accordance with claim 2, wherein said fifth means is constructed and arranged to either increase or decrease the count of said counting means in response to said tape speed correcting signal.

4. The invention in accordance with claim 3, wherein said tape is magnetic, and wherein said fourth means includes:
   a magnetic head having at least one write head and one read head arranged for read-after-write operation with respect to said tape; and
   means for providing said tape speed correcting signal based on a measurement of the elapsed time between the writing of a signal written at the write head and the reading of the same signal at the read head.

5. The invention in accordance with claim 4, wherein the desired predetermined speed is a constant speed, wherein said counting means is a digital counter which produces a digital output signal representative of the count thereof, and wherein said third means comprises:
   a digital to analog inverter for converting digital output signal from said counter to an analog signal; and
   means coupled to the output of said digital to analog converter for modifying said analog signal to provide an output signal to said first means which results in said driven reel being driven at an angular velocity inversely proportional to the digital output signal of said counter.

6. The invention in accordance with claim 3, wherein said fourth means is constructed and arranged to produce tape speed correcting pulses at predetermined time intervals during movement of said tape, each tape correcting pulse having a first polarity when the tape speed is greater than the desired predetermined tape speed and having a second polarity when the tape speed is less than the desired predetermined tape speed, and wherein said fifth means operates in response to each tape correcting pulses to change the count of said counting means in a direction determined by the polarity thereof.

7. In a magnetic tape transport system including a magnetic head having at least one write head and one read head arranged for read-after-write operation with respect to said tape, apparatus for transporting the tape between supply and take-up reels in a manner so as to provide improved control of tape speed comprising:
   first means responsive to an applied control signal for driving one of said reels;
   second means for providing an output signal dependent on the number of layers of tape wound on the driven wheel;
   third means responsive to the output signal from said second means for providing a control signal to said first means chosen for a given tape and driving reel so as to cause rotation of the driven reel at a varying angular velocity which provides a substantially constant tape speed as the tape is wound;
   fourth means for measuring the actual speed of the tape and for producing a tape speed correcting signal indicative of whether the actual tape speed is different from said constant tape speed, said fourth means comprising;
   tape speed measuring means for providing a tape speed measurement based on a measurement of the time required for data recorded by the write head to be read at the read head; and
   comparing means for producing said tape speed correcting signal in response to a comparison of said tape speed measurement with a reference value; and fifth means responsive to said tape speed correcting signal for modifying the output signal provided by said second means in a manner so as to cause said second means to produce a resulting control signal which controls the angular velocity of said driven wheel to provide a tape speed more accurately conforming to the desired constant tape speed.

8. The invention in accordance with claim 7, wherein data is recorded in digital form on said tape, wherein said tape speed measuring means and said comparing means are constructed and arranged to provide said correcting signal at predetermined spaced time intervals during recording on said tape dependent upon the time required for a digital signal recorded at the write head to be read at the read head; and wherein said fifth means is constructed and arranged to change the output signal provided by said second means in a direction which causes said third means to reduce the error between the measured tape speed and the desired constant tape speed.

9. The invention in accordance with claim 8, wherein said second means includes a digital counter providing a digital output count dependent on the number of layers of tape wound on the driven reel, wherein said comparing means is constructed and arranged to produce tape speed correcting pulses at predetermined time intervals during recording on said tape, each tape speed correcting pulse being of a first type when the measured tape speed is too fast and of a second type when the measured tape speed is too slow, and wherein said fifth means operates in response to each tape speed correcting pulse to change the count of said counter in a direction dependent upon the type of correction pulse applied thereto.

10. The invention in accordance with claim 9, wherein said tape measuring means includes:
read/write circuitry cooperating with said read and write heads for writing on and reading from said tape self-clocked digital data as said tape is moved past said head, said read/write circuitry providing write clock signals and read clock signals;
a first digital counter;
an adjustable oscillator providing output pulses to said first digital counter for advancing said first digital counter at a predetermined rate;
a second digital counter which advances in response to said read clock signals; and
setting means responsive to said write clock signals for setting each counter to an initial value.

11. The invention in accordance with claim 10, wherein said comparing means includes:
means coupled to said first and second digital counters for comparing the outputs thereof and for providing at each of a plurality of sampling times a tape speed correcting pulse of a first polarity when the measured tape speed is too fast and a tape speed correcting pulse of a second polarity when the measured tape speed is too slow.

12. A method of controlling tape speed in a tape transport system in which a tape is transported between supply and take-up reels, said method comprising the steps of:
driving one of said reels in response to a control signal;
generating a series of signals corresponding to the number of revolutions of the driven reel;
counting said series of signals to produce an accumulated count dependent upon the number of layers of tape wound on the driven reel;
generating said control signal in response to said accumulated count so that the driven reel is driven at an angular velocity substantially inversely proportional to the diameter of tape on the driven reel;
measuring actual tape speed;
comparing the measured tape speed with a reference value to provide a tape speed error indication; and
modifying said accumulated count in response to the tape speed error indication so as to cause said control signal to in turn modify the angular velocity of the driven wheel in a direction which will reduce the tape speed error.

13. The invention in accordance with claim 12, wherein the step of comparing is such as to provide said tape speed error indication at spaced time intervals, and wherein the step of modifying is such as to cause said accumulated count to be incremented in one direction when the tape speed is too fast and in the opposite direction when the tape speed is too slow.

14. The invention in accordance with claim 13, wherein said tape transport system includes a magnetic head having at least one write head and one read head arranged for read-after-write operation with respect to a magnetic tape, and wherein the step of measuring actual tape speed includes measuring the time required for a signal written at the write head to arrive at the read head.

* * * * *

UNITED STATES PATENT AND TRADEMARK OFFICE
CERTIFICATE OF CORRECTION

PATENT NO. : 3,984,868
DATED : October 5, 1976
INVENTOR(S) : H.U. Ragle, F.A. Morse and L.B. Coon, Jr.

It is certified that error appears in the above-identified patent and that said Letters Patent are hereby corrected as shown below:

Col. 2, line 37, change "serve" to --servo--.
Col. 4, line 24, delete "%".
       line 43, delete "of".
Col. 7, line 7, change "of", first occurrence, to --or--.
       line 50, change "or" to --of--.

line 28, change "for" to --of--.
       line 44, change "as" to --a--.
Col. 9, line 20, delete "0" before .0675%.
Col. 10, line 36, after "tape" insert --speed--.
       change "pulses" to --pulse--.

Signed and Sealed this

Fifteenth Day of March 1977

[SEAL]

Attest:

RUTH C. MASON
*Attesting Officer*

C. MARSHALL DANN
*Commissioner of Patents and Trademarks*